US012752848B2

(12) United States Patent
Yeung et al.

(10) Patent No.: US 12,752,848 B2
(45) Date of Patent: Oct. 6, 2026

(54) ADAPTIVE SENSITIVITY CONTROL FOR INVOKING DISPLAY OF PARKING ASSISTANCE

(71) Applicant: Rivian IP Holdings, LLC, Irvine, CA (US)

(72) Inventors: Fai Yeung, Palo Alto, CA (US); Brian K. Chan, Santa Clara, CA (US); Krishna Kumar Madaparambil, San Jose, CA (US); Matthew Royce Miller, San Francisco, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 60 days.

(21) Appl. No.: 18/827,562

(22) Filed: Sep. 6, 2024

(65) Prior Publication Data

US 2025/0083744 A1 Mar. 13, 2025

Related U.S. Application Data

(60) Provisional application No. 63/581,221, filed on Sep. 7, 2023.

(51) Int. Cl.

| | |
|---|---|
| ***G08G 1/14*** | (2006.01) |
| ***B60W 50/14*** | (2020.01) |
| ***B62D 15/02*** | (2006.01) |

(52) U.S. Cl.

CPC ........... *B62D 15/028* (2013.01); *B60W 50/14* (2013.01); *B62D 15/021* (2013.01); *B60W 2050/146* (2013.01); *B60W 2420/403* (2013.01); *B60W 2520/105* (2013.01); *B60W 2540/18* (2013.01)

(58) Field of Classification Search

CPC .. B62D 15/028; B62D 15/021; B62D 15/025; B62D 15/027; B60W 50/14; B60W 2050/146; B60W 2420/403; B60W 2520/105; B60W 2540/18

USPC ...................................................... 340/932.2

See application file for complete search history.

(56) References Cited

U.S. PATENT DOCUMENTS

| | | | | |
|---|---|---|---|---|
| 9,290,174 | B1 * | 3/2016 | Zagorski ............... | B60W 30/18 |
| 9,914,460 | B2 * | 3/2018 | Hunt ..................... | B60W 30/08 |
| 11,062,602 | B1 * | 7/2021 | Beaurepaire ........... | G08G 1/146 |
| 11,884,263 | B2 * | 1/2024 | Niewiadomski ..... | G08G 1/0133 |
| 12,354,302 | B2 * | 7/2025 | Shigemura ................ | G06T 7/60 |
| 2012/0139754 | A1 * | 6/2012 | Ginsberg ......... | G08G 1/096775 340/905 |
| 2014/0257659 | A1 * | 9/2014 | Dariush ................. | G08G 1/166 701/1 |

(Continued)

*Primary Examiner* — Tai T Nguyen

(74) *Attorney, Agent, or Firm* — Patterson + Sheridan, L.L.P.

(57) ABSTRACT

A vehicle includes an output device configured to communicate to a driver of the vehicle and an in-vehicle control system. The in-vehicle control system is configured to evaluate one or more trigger inputs including at least one of a current dynamic state of the vehicle or an attribute of an environment of the vehicle. The in-vehicle control system processes the one or more trigger inputs according to a dynamic model having a state with a time-dependent response to changes in the one or more trigger inputs. The state of the dynamic model is evaluated with respect to a threshold condition. In response to the dynamic model satisfying the threshold condition, guidance is provided to the driver through the output device.

20 Claims, 15 Drawing Sheets

(56) References Cited

U.S. PATENT DOCUMENTS

| | | | | |
|---|---|---|---|---|
| 2017/0153737 | A1* | 6/2017 | Chawda | G06F 3/0418 |
| 2018/0101739 | A1* | 4/2018 | Zhang | G06V 20/58 |
| 2020/0324701 | A1* | 10/2020 | Usui | H04N 23/90 |
| 2022/0073101 | A1* | 3/2022 | Wang | B62D 15/0285 |

* cited by examiner

ADAPTIVE SENSITIVITY CONTROL FOR INVOKING DISPLAY OF PARKING ASSISTANCE

RELATED APPLICATION

This application claims the benefit of U.S. Application Ser. No. 63/581,221 filed Sep. 7, 2023, and entitled ADAPTIVE SENSITIVITY CONTROL FOR INVOKING DISPLAY OF PARKING ASSISTANCE.

INTRODUCTION

The present disclosure relates to assistance provided to a driver of a vehicle when parking.

SUMMARY

The present disclosure describes an approach for determining when to display parking assistance according to a dynamic model. According to an embodiment, a vehicle includes an output device configured to communicate to a driver of the vehicle and an in-vehicle control system. The in-vehicle control system is configured to evaluate one or more trigger inputs including at least one of a current dynamic state of the vehicle or an attribute of an environment of the vehicle. The in-vehicle control system processes the one or more trigger inputs according to a dynamic model having a state with a time-dependent response to changes in the one or more trigger inputs. The state of the dynamic model is evaluated with respect to a threshold condition. In response to the dynamic model satisfying the threshold condition, guidance is provided to the driver through the output device.

DETAILED DESCRIPTION

A driver's attention when driving is clearly primarily focused on the road ahead and vehicles and obstacles around the driver's vehicle. Screens, buttons, and other control inputs in the cabin of the vehicle should therefore be easy to use in order to avoid distracting the driver. With the use of screens, a vehicle designer is able to select what information is displayed to the driver. In a similar manner, this information should communicate essential information when needed without distracting the driver.

In the embodiments disclosed herein, one or more screens in the vehicle are used to provide parking assistance by displaying a top-down view of the vehicle as well as video from one or more cameras of the vehicle. To avoid requiring the driver to manually invoke display of the parking assistance, the in-vehicle control system of the vehicle determines when to provide parking assistance based on the state of the vehicle and various other triggers. Based on that determination, parking assistance is then automatically displayed on the one or more screens in the vehicle.

Although automatic display removes one source of distraction, the display of parking assistance should advantageously not displace other information that is of greater importance to the driver. It is therefore advantageous to more accurately predict when to display parking assistance and when to cease doing so. The system and methods described below use a dynamic model with a time-dependent response to trigger inputs to select when to display and cease to display parking assistance.

Figure 1A:
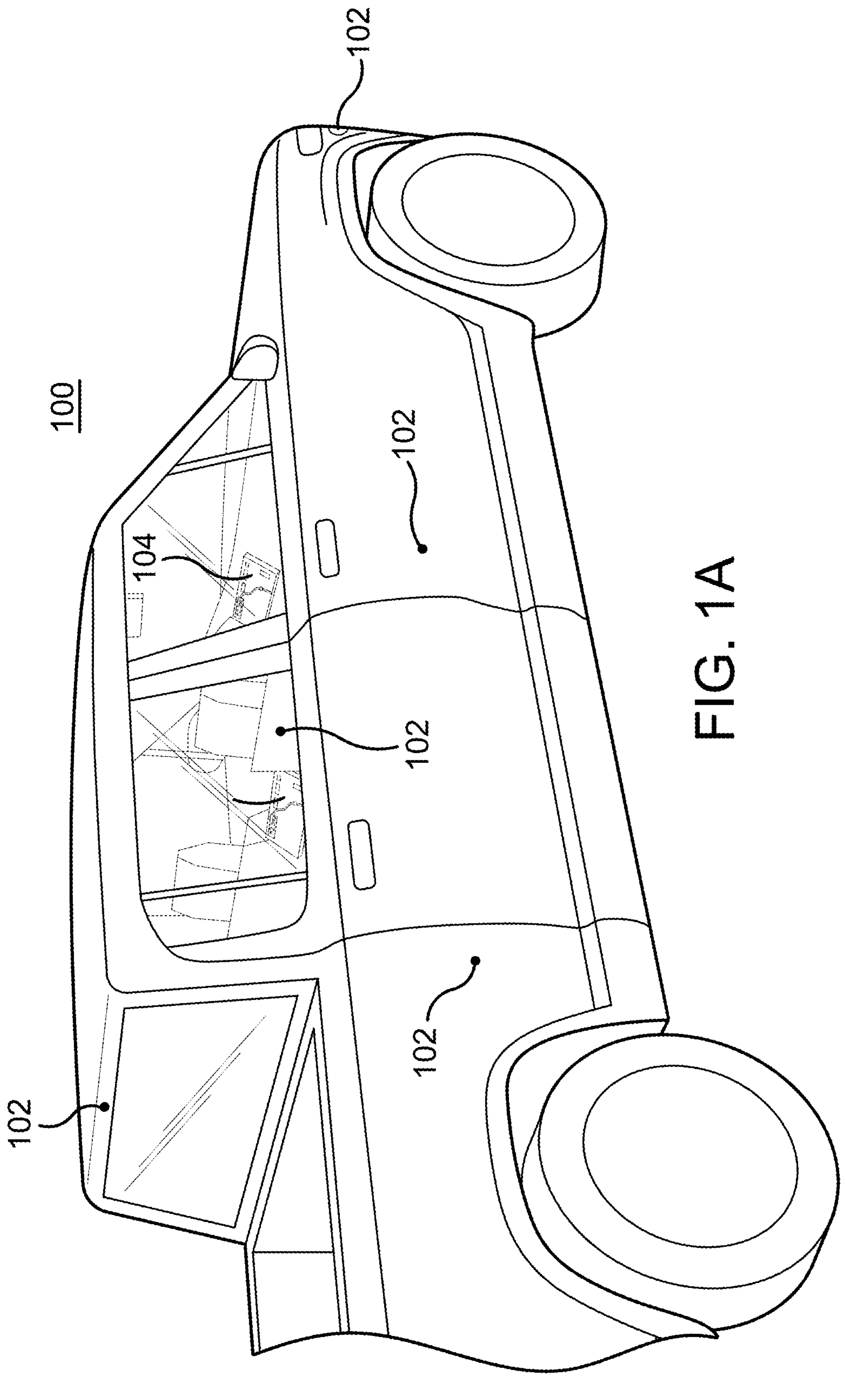
FIG. 1A illustrates an example vehicle for displaying parking assistance in accordance with certain embodiments.

FIG. 1A illustrates an example vehicle 100. As seen in FIG. 1A, the vehicle 100 has multiple exterior cameras 102 and one or more displays 104. Each of these exterior cameras 102 may capture a particular view or perspective on the outside of the vehicle 100. The images or videos captured by the exterior cameras 102 may then be presented on one or more displays in the vehicle 100. As seen in FIG. 1A, the vehicle 100 includes one or more front displays 104 for viewing by a driver.

Figure 1B:
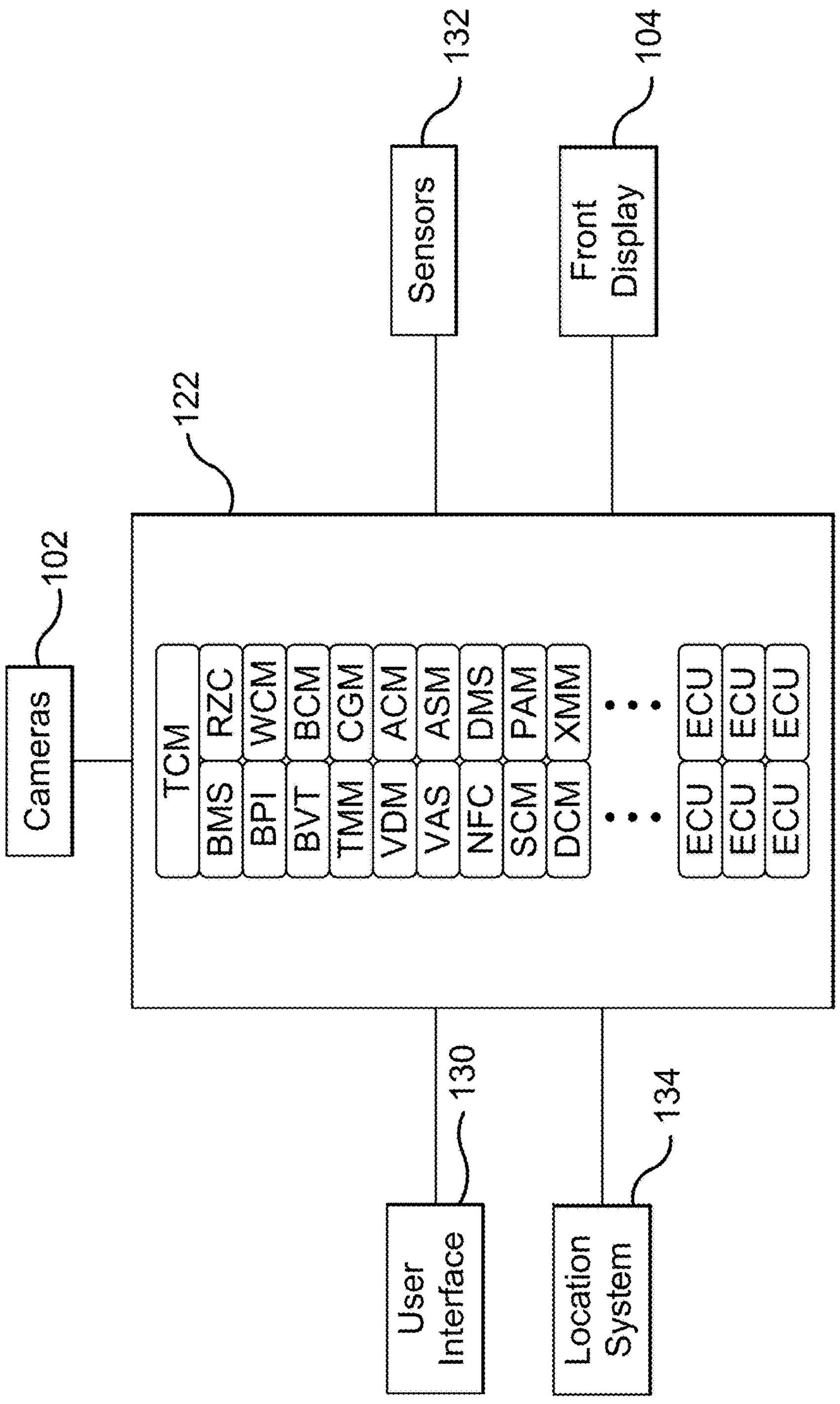
FIG. 1B illustrates example components of the vehicle of FIG. 1A, in accordance with certain embodiments.

FIG. 1B illustrates example components of the vehicle 100 of FIG. 1A. As seen in FIG. 1B, the vehicle 100 includes the cameras 102, the one or more front displays 104, a user interface 130, one or more sensors 132, and a location system 134. The one or more sensors 132 may include ultrasonic sensors, radio detection and ranging (RADAR) sensors, light detection and ranging (LIDAR) sensors, or other types of sensors. The location system 134 may be implemented as a global positioning system (GPS) receiver. The user interface 130 allows a user, such as a driver or passenger in the vehicle 100, to provide input.

The control system 122 executes instructions to perform at least some of the actions or functions of the vehicle 100, including the functions described in relation to FIGS. 3A to 9. For example, as shown in FIG. 1B, the control system 122 may include one or more electronic control units (ECUs) configured to perform at least some of the actions or functions of the vehicle 100, including the functions described in relation to FIGS. 3A to 9. In certain embodiments of FIG. 1B, each of the ECUs is dedicated to a specific set of functions. Each ECU may be a computer system and each ECU may include functionality described below in relation to FIGS. 3A to 9.

Certain features of the embodiments described herein may be controlled by a Telematics Control Module (TCM) ECU. The TCM ECU may provide a wireless vehicle communication gateway to support functionality such as, by way of example and not limitation, over-the-air (OTA) software updates, communication between the vehicle and the internet, communication between the vehicle and a computing device, in-vehicle navigation, vehicle-to-vehicle communication, communication between the vehicle and landscape features (e.g., automated toll road sensors, automated toll gates, power dispensers at charging stations), or automated calling functionality.

Certain features of the embodiments described herein may be controlled by a Central Gateway Module (CGM) ECU. The CGM ECU may serve as the vehicle's communications hub that connects and transfer data to and from the various ECUs, sensors, cameras, microphones, motors, displays, and other vehicle components. The CGM ECU may include a network switch that provides connectivity through Controller Area Network (CAN) ports, Local Interconnect Network (LIN) ports, and Ethernet ports. The CGM ECU may also serve as the master control over the different vehicle modes (e.g., road driving mode, parked mode, off-roading mode, tow mode, camping mode), and thereby control certain vehicle components related to placing the vehicle in one of the vehicle modes.

In various embodiments, the CGM ECU collects sensor signals from one or more sensors of vehicle 100. For example, the CGM ECU may collect data from cameras 102 and sensors 132. The sensor signals collected by the CGM ECU are then communicated to the appropriate ECUs for performing, for example, the operations and functions described in relation to FIGS. 3A to 9.

The control system 122 may also include one or more additional ECUs, such as, by way of example and not limitation: a Vehicle Dynamics Module (VDM) ECU, an Experience Management Module (XMM) ECU, a Vehicle Access System (VAS) ECU, a Near-Field Communication (NFC) ECU, a Body Control Module (BCM) ECU, a Seat Control Module (SCM) ECU, a Door Control Module (DCM) ECU, a Rear Zone Control (RZC) ECU, an Autonomy Control Module (ACM) ECU, an Autonomous Safety Module (ASM) ECU, a Driver Monitoring System (DMS) ECU, and/or a Winch Control Module (WCM) ECU. If vehicle 100 is an electric vehicle, one or more ECUs may provide functionality related to the battery pack of the vehicle, such as a Battery Management System (BMS) ECU, a Battery Power Isolation (BPI) ECU, a Balancing Voltage Temperature (BVT) ECU, and/or a Thermal Management Module (TMM) ECU. In various embodiments, the XMM ECU transmits data to the TCM ECU (e.g., via Ethernet, etc.). Additionally or alternatively, the XMM ECU may transmit other data (e.g., sound data from microphones, etc.) to the TCM ECU.

Figure 2:
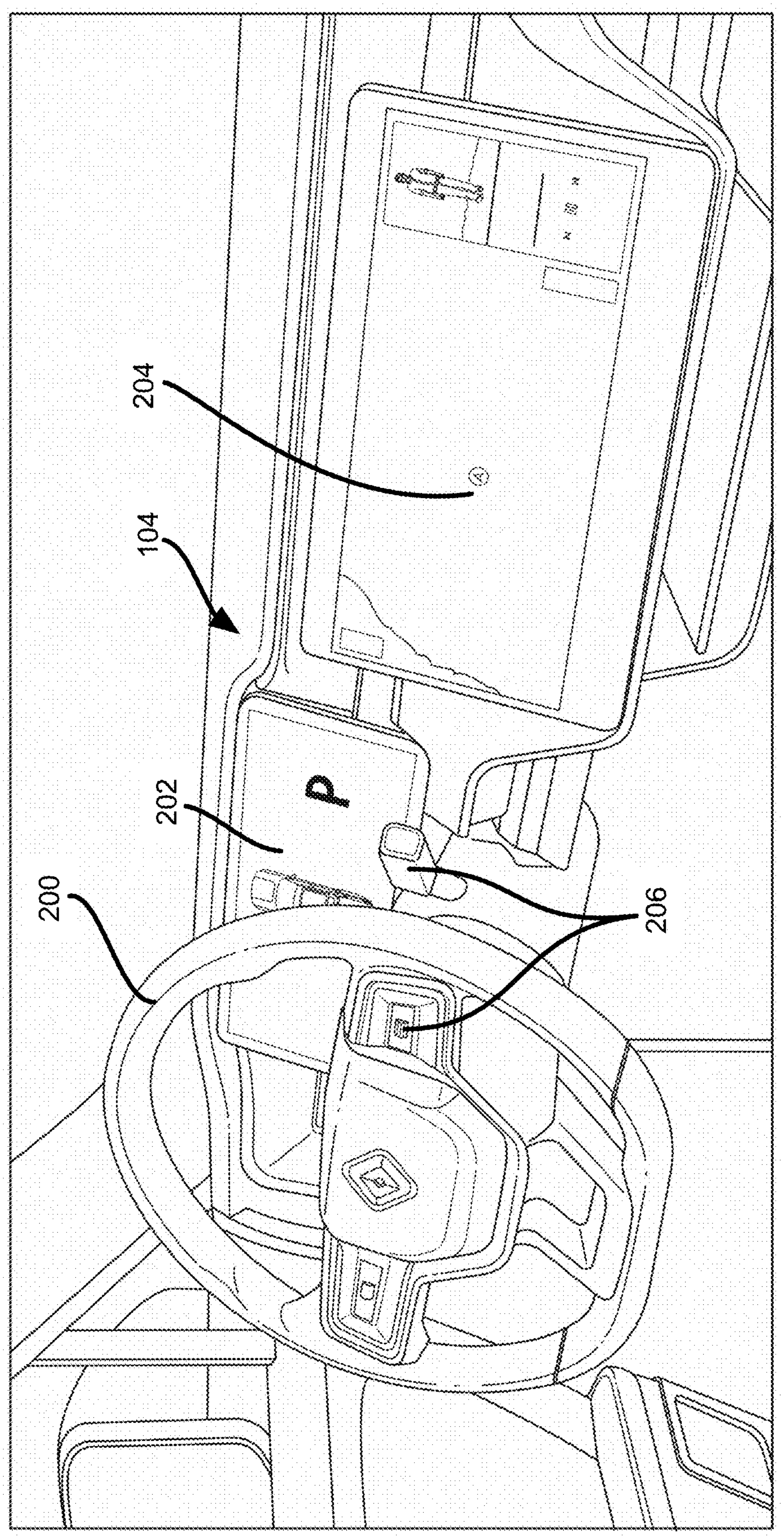
FIG. 2 illustrates display devices that may be used provide parking assistance in accordance with certain embodiments.

Referring to FIG. 2, the interior of the vehicle 100 includes a steering wheel 200 that is turned by the user to invoke turning of the vehicle 100 by some or all of changing the angle of the front wheels, changing the angle of the rear wheels, and changing the relative speeds of wheels on the right and left sides of the vehicle The one or more front displays 104 may include a dashboard display device 202 mounted in a dashboard of the interior of the vehicle 100. The control system 122 may use the dashboard display device 202 to display vehicle state information (speed, state of charge, drive-train state (drive, park, reverse)), navigation information (maps, directions, etc.) or other information.

The one or more front displays 104 may further include an infotainment display device 204. The infotainment display device 204 may be embodied as a touch screen located to one side of the steering wheel 200. The control system 122 may therefore cause the infotainment display device 204 to display interfaces for controlling systems of the vehicle and receive and execute inputs received through the interfaces from a driver or passenger.

The user interface 130 may include touch screen capabilities of one or both of the dashboard display device 202 and the infotainment display device 204. The user interface 130 may include driver controls secured to some or all of the steering wheel 200, steering column, center console, or other portion of the vehicle 100. As noted above, the driver controls 206 may be used to select a drive gear (forward, neutral, reverse), a drive mode (e.g., economical, sport, off-road, sand, snow, etc.) or control other aspects of the operation of the vehicle 100.

Figure 3A:
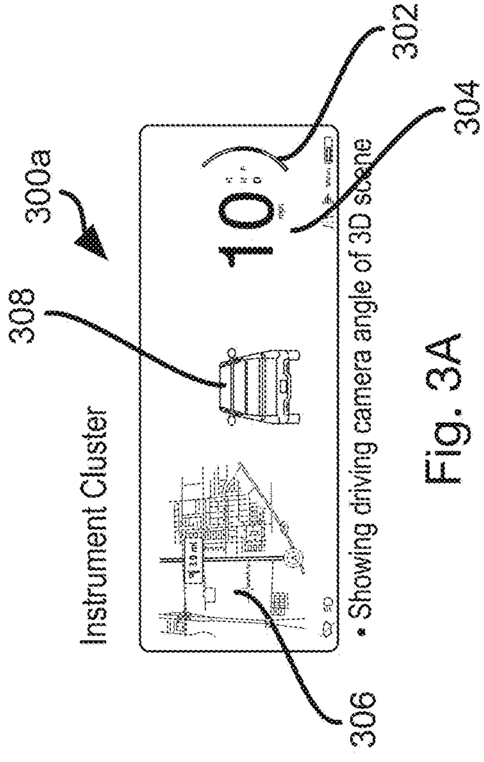
FIG. 3A illustrates an example interface that may be displayed on a dashboard display device in the absence of parking assistance.

FIG. 3A illustrates an example interface 300*a* that may be displayed on the dashboard display device 202 in the absence of parking assistance being displayed. The interface 300*a* may include such information as a current drive mode 302 of the vehicle 100 (reverse, neutral, drive, park), a speed 304 of the vehicle 100, and navigation information 306. The interface 300*a* may further include a diagram 308 or other representation of a state of the vehicle 100. Other information displayed in the interface 300*a* may include a state of charge of a battery, amount of remaining fuel, headlight state, whether adaptive cruise control is turned, or other information regarding the state of the vehicle 100.

Figure 3B:
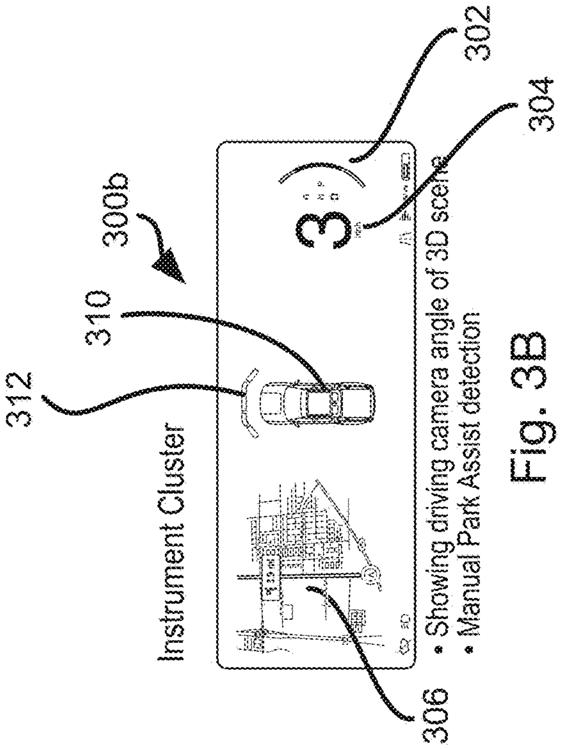
FIG. 3B illustrates an example interface that may be displayed on an infotainment display device in the absence of parking assistance.

Referring to FIG. 3B, when parking assistance is active, the interface 300*b* may be displayed. The interface 300*b* may include some or all of the same information of the interface 300*a* and additionally includes one or more parking guides. For example, in the illustrated example, a top-down diagram 310 of the vehicle 100 is displayed with indicators 312 communicating where ultrasonic sensor or other sensors 132 of the vehicle 100 indicate an obstacle to be present and possibly an indicator of an estimated distance to the obstacle.

Figure 4A:
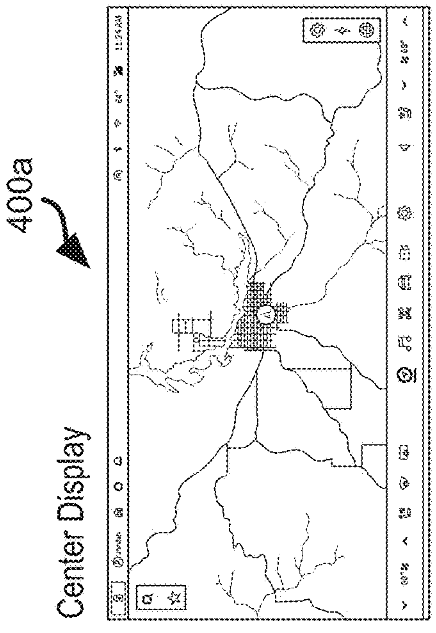
FIG. 4A illustrates an example interface including parking assistance that may be displayed on a dashboard display device.

FIG. 4A illustrates an example interface 400*a* that may be displayed on the infotainment display device 204 when parking assistance is not active. In the illustrated example, only navigation information is displayed along with graphical user interface elements for controlling the display of navigation information. The interface 400*a* is exemplary only. Any other interface for controlling any aspect of the vehicle 100 may be displayed, such as climate controls (heating, cooling, ventilation), sound system controls, seat adjustment controls, or the like.

Figure 4B:
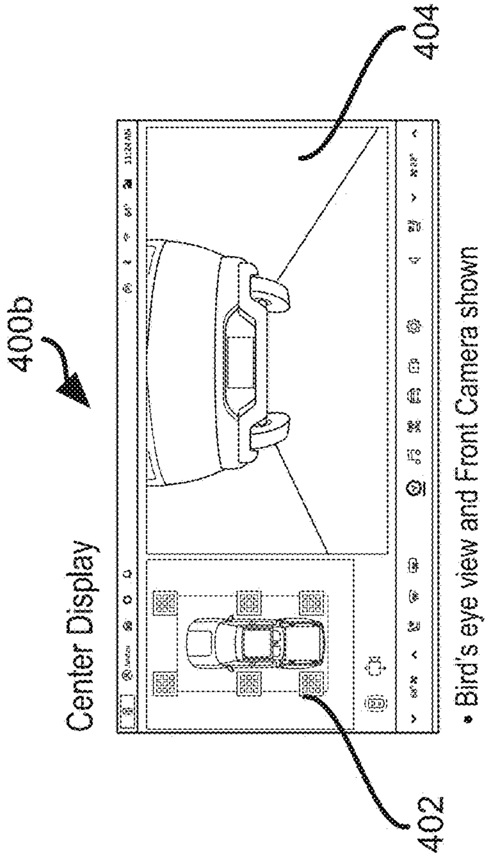
FIG. 4B illustrates an example interface including parking assistance that may be displayed on the infotainment display device.

FIG. 4B illustrates an example interface 400*b* that may be displayed on the infotainment display device 204 when parking assistance is active. In the illustrated example, the interface 400*b* includes a top-down view 402 of the vehicle 100, also known as the "bird's eye view." The top-down view 402 may be generated by combining images from various cameras 102 on the front, rear, and sides, of the vehicle 100 in order to simulate an image that might be captured from a point of view directly above the vehicle 100. The top-down view 402 enables the driver to readily perceive obstacles that may not be visible through the windshield, side windows, and rear window of the vehicle 100.

The interface 400*b* may include other parking assistance, such as a display 404 of the output of an individual rear view, front view, or side view camera. The interface 400*b* may include controls enabling the driver to instruct the control system 122 to display the output of a camera selected by the driver. The interface 400*b* is exemplary only. Other parking assistance may likewise be displayed as part of the interface 400*b* either automatically or in response to an input from the driver.

In the following description, parking assistance is provided on one or both of the dashboard display device 202 and the infotainment display device 204. However, these display devices 202, 204 are only examples of output devices that may be used to provide parking assistance. Parking assistance may be provided in the form of spoken words or other audio signals output from a speaker, flashing lights, haptic feedback or any other output device providing a human perceptible output.

FIGS. 5A to 5E illustrate example scenarios where providing parking assistance is appropriate. FIG. 5F illustrates an example of a scenario where parking assistance is not appropriate and should be distinguished from the scenarios of FIGS. 5A to 5E. FIG. 5F illustrates a scenario where parking assistance would be helpful but the need for parking assistance might be difficult to detect.

Figure 5A:
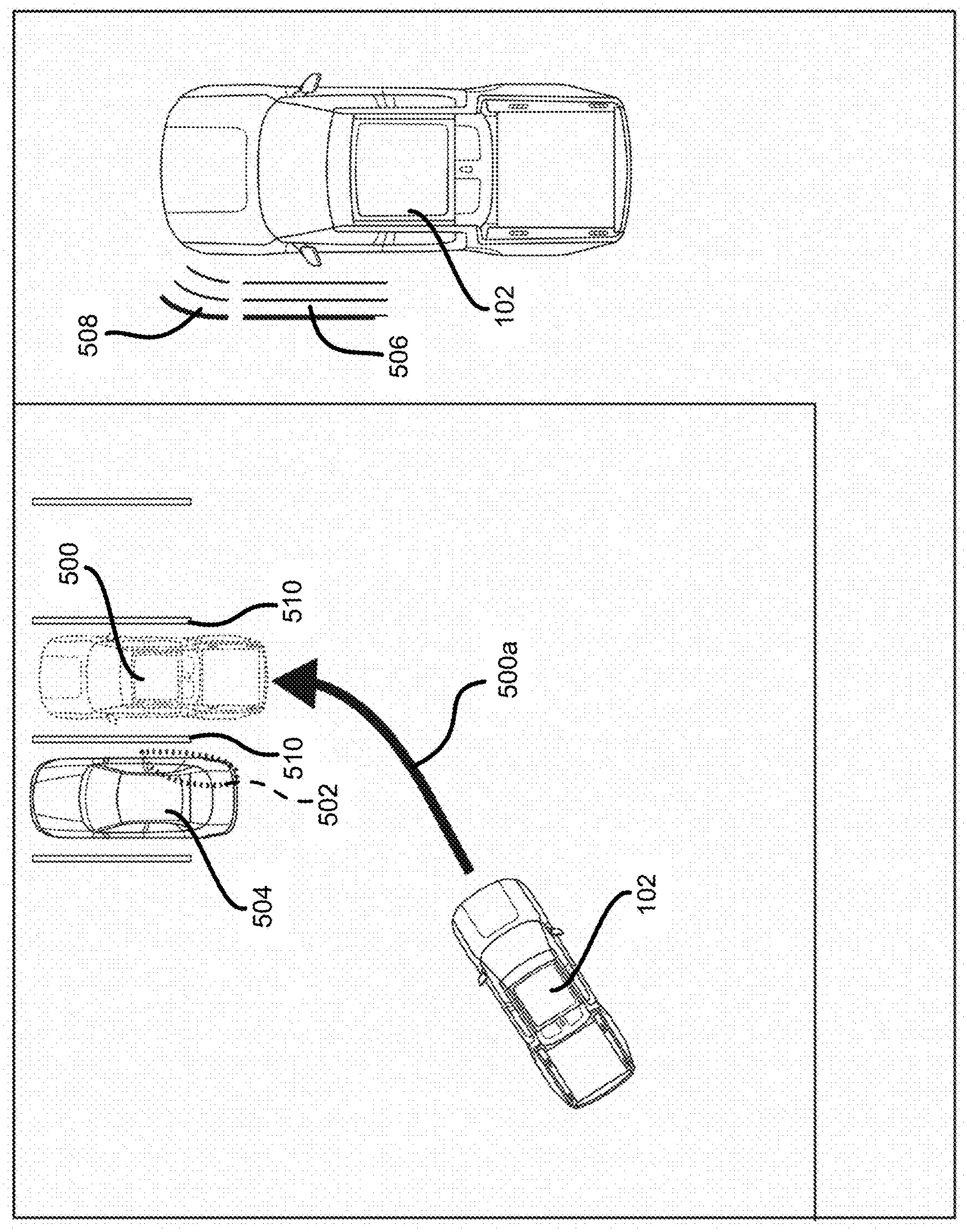
FIGS. 5A to 5G illustrate scenarios encountered during driving in which display of parking assistance either is or is not appropriate.

Referring specifically to FIG. 5A, as the vehicle 100 approaches parking position 500 along path 500*a*, ultrasonic or other sensors of the vehicle 100 will detect portion 502 of a vehicle 504 parked adjacent the parking position 500. The ultrasonic sensors in regions 506, 508 may therefore be triggered. The slow speed of the vehicle 100 along with obstacle detection within the regions 506, 508 appropriately indicate that the vehicle 100 is parking and that parking assistance is likely helpful. Markers 510 on pavement on either side of the vehicle 100 may be visible in side cameras of the vehicle 100. The short length (as opposed to the long and continuous lane markers of a road) of the markers 510 may likewise indicate that parking assistance is likely helpful.

Figure 5B:
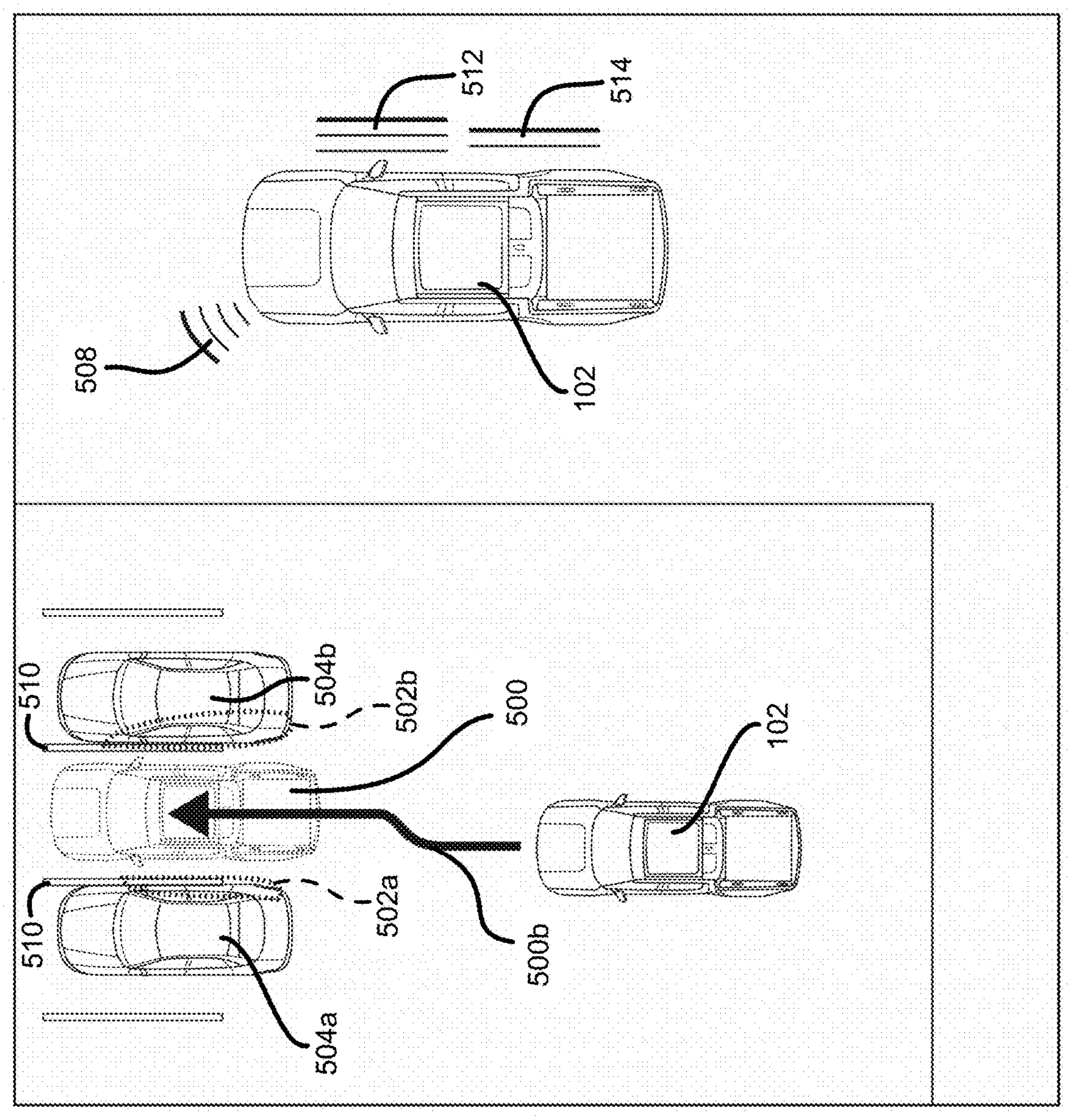

Referring specifically to FIG. 5B, as the vehicle 100 moves into parking position 500 along path 500*b*, ultrasonic or other sensors of the vehicle 100 may detect portion 502*a*, 502*b* of vehicles 504*a*, 504*b* parked on either side of the parking position 500. The ultrasonic sensors in regions 508, 512, 514 may therefore be triggered. The slow speed of the vehicle 100 along with obstacle detection within the regions 508, 512, 514 appropriately indicate that the vehicle 100 is parking and that parking assistance is likely helpful. In the example of FIG. 5B, markers 510 indicating boundaries of the parking position 500 may not be visible to cameras of the vehicle 100.

Figure 5C:
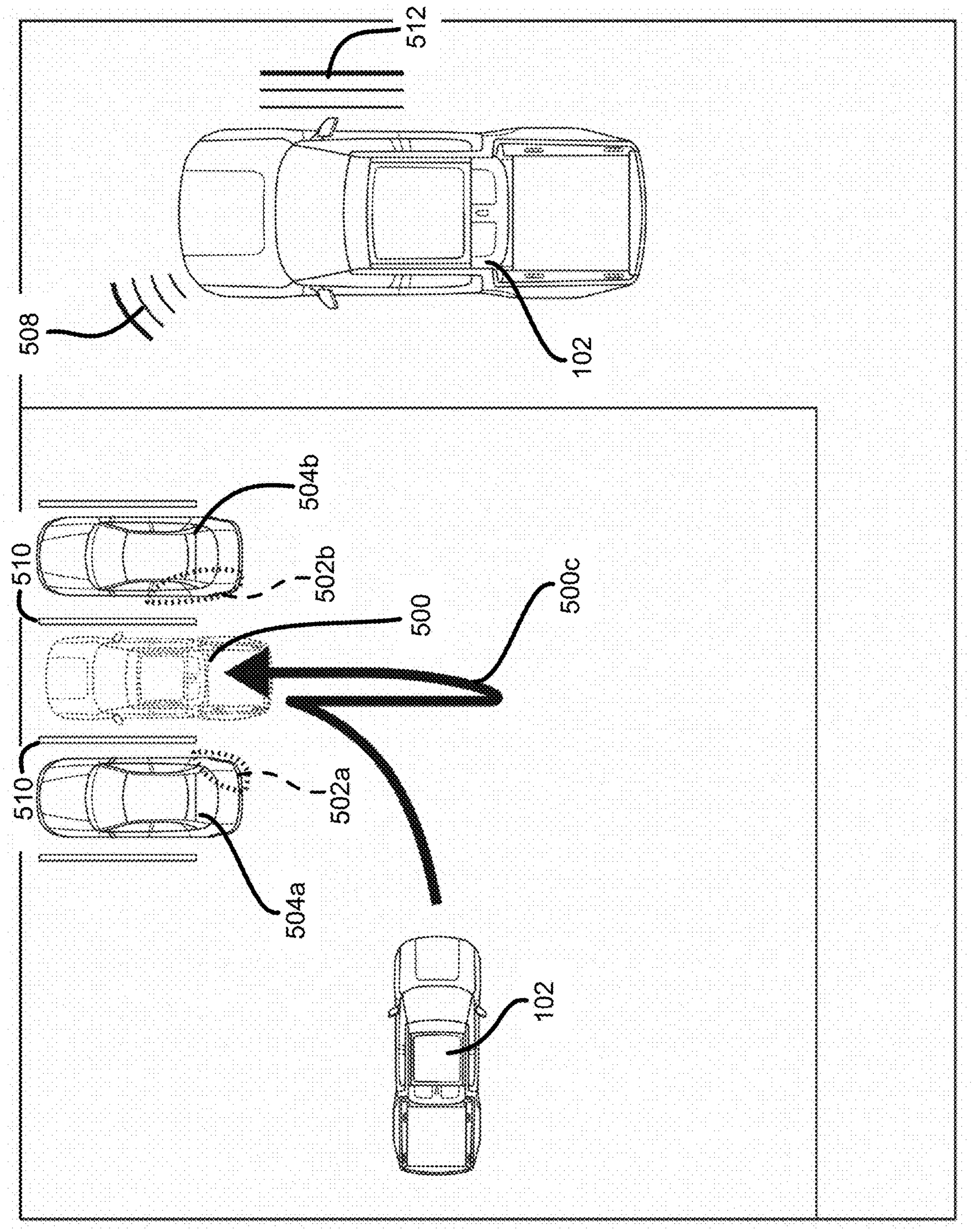

Referring to FIG. 5C, in another scenario, the vehicle 100 traverses a forward and reverse path 500*c* indicating a multi-point turn, which may indicate that parking assistance would be helpful along with outputs of the ultrasonic sensors in one or more regions 506, 512, 514 and/or the detection of markers 510 indicating boundaries of a parking position 500.

Figure 5D:
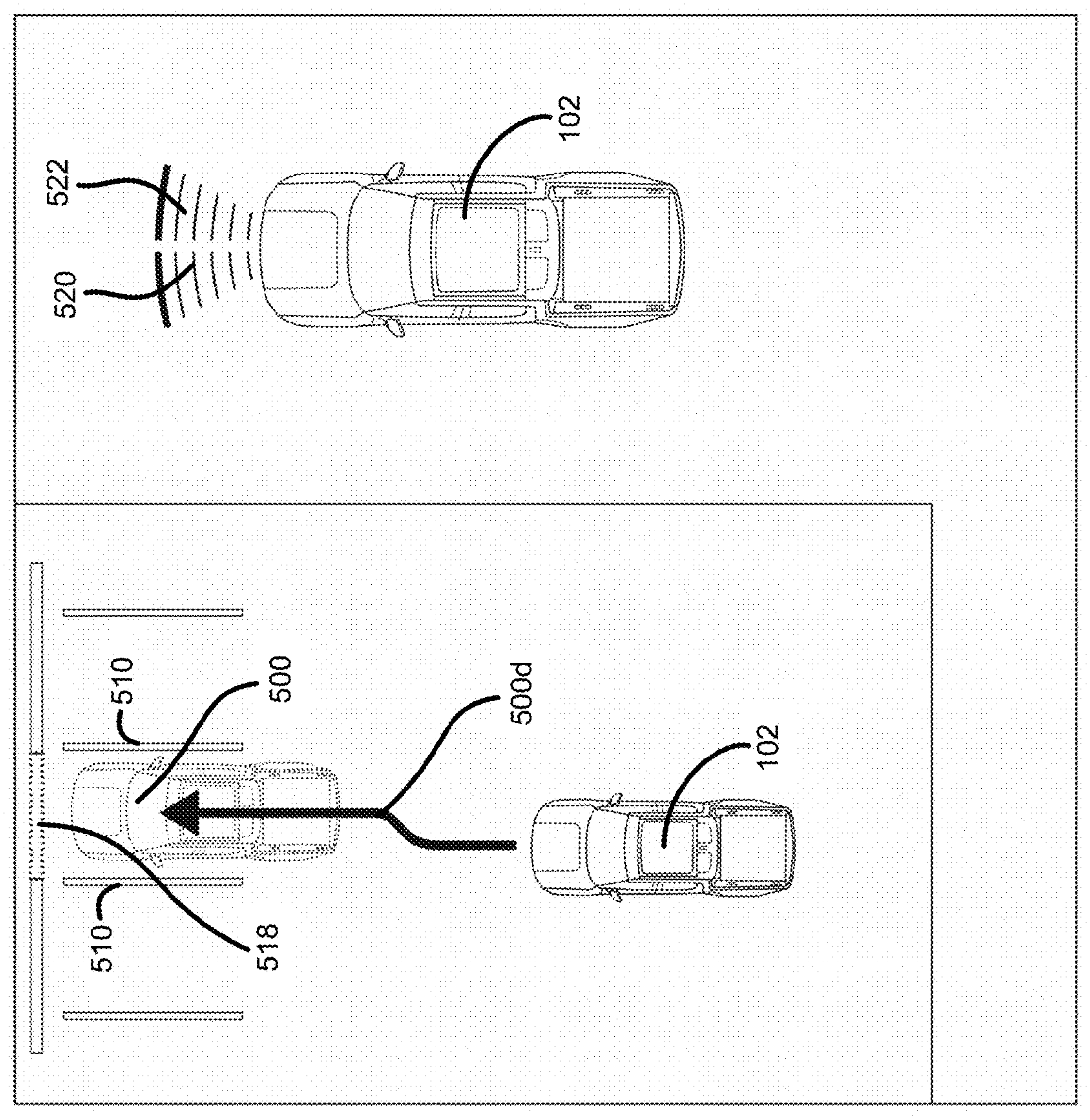

Referring to FIG. 5D, in another scenario, the vehicle 100 moves into a parking position 500 along path 500*d* at a slow speed and toward a barrier 518 at one end of the parking position. The barrier 518 detected in regions 520, 522 by ultrasonic sensors of the vehicle 100 indicates that parking assistance would be helpful. Markers 510 indicating boundaries of a parking position 500 may likewise be detected and indicate that parking assistance would be helpful.

Figure 5E:
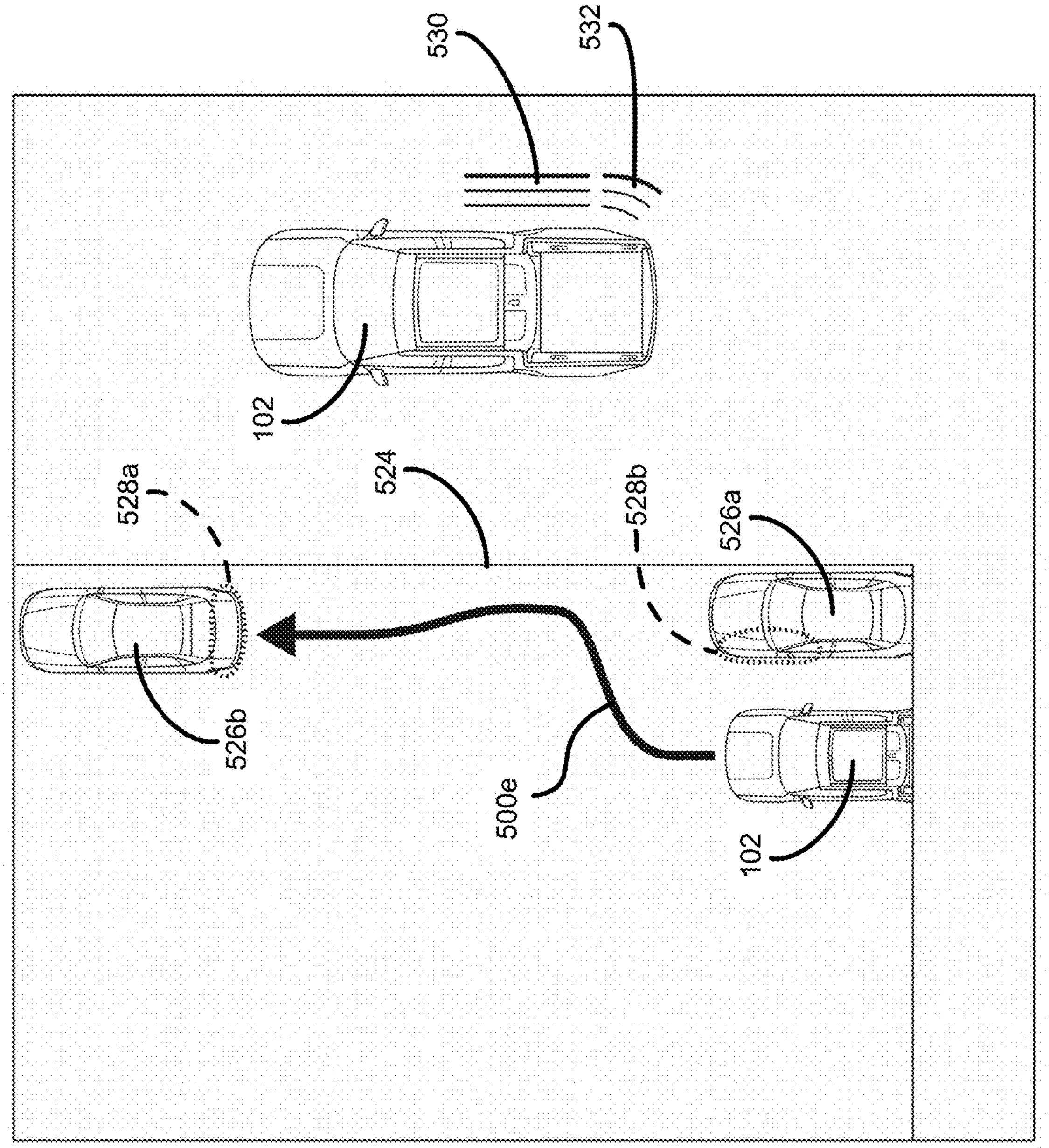
Figure 5F:
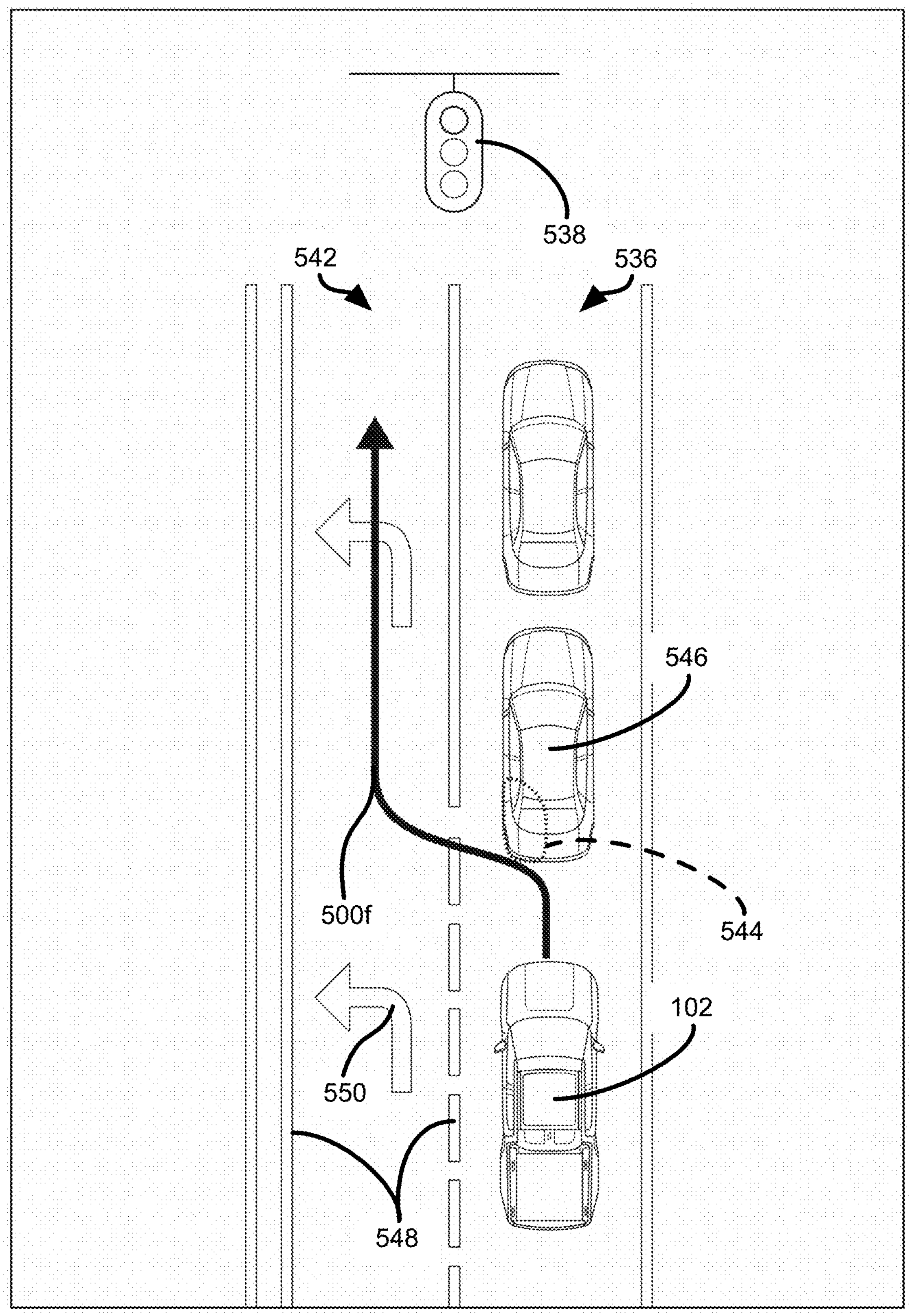

FIG. 5E illustrates a scenario in which the vehicle 100 parallel parks along a curb 524 between two vehicles 526*a*, 526*b* along path 500*e*. Ultrasonic sensors of the vehicle 100 may detect portions 528*a*, 528*b* of the vehicles 526*a*, 526*b*, such as in regions 530, 532, or any of the above-referenced regions 506, 508, 512, 514, 520, 522 referenced above. The detection of the portions 528*a*, 528*b* of the vehicle 526*a*, 526*b* as well as a low-speed traversal of a path 500*e* corresponding to parallel parking may all indicate that parking assistance would be helpful.

FIG. 5F illustrates a scenario in which a false positive might occur. The vehicle 100 in a first lane 536 stopped at a stoplight 538 makes a slow speed traversal of path 500*f* into an adjacent lane 542, such as a left-hand turn lane. In doing so, ultrasonic sensors of the vehicle detect a portion 544 of another vehicle 546. The slow speed and shape of the path 500*f* correspond generally to the act of parallel parking or exiting a parallel parking position. Accordingly, factors such as long and continuous lane markers 548, the presence of the stoplight 538, arrows 550 on pavement, signs, or other factors inconsistent with parking or leaving a parking position may be used to determine that parking assistance is not helpful in this scenario.

Figure 5G:
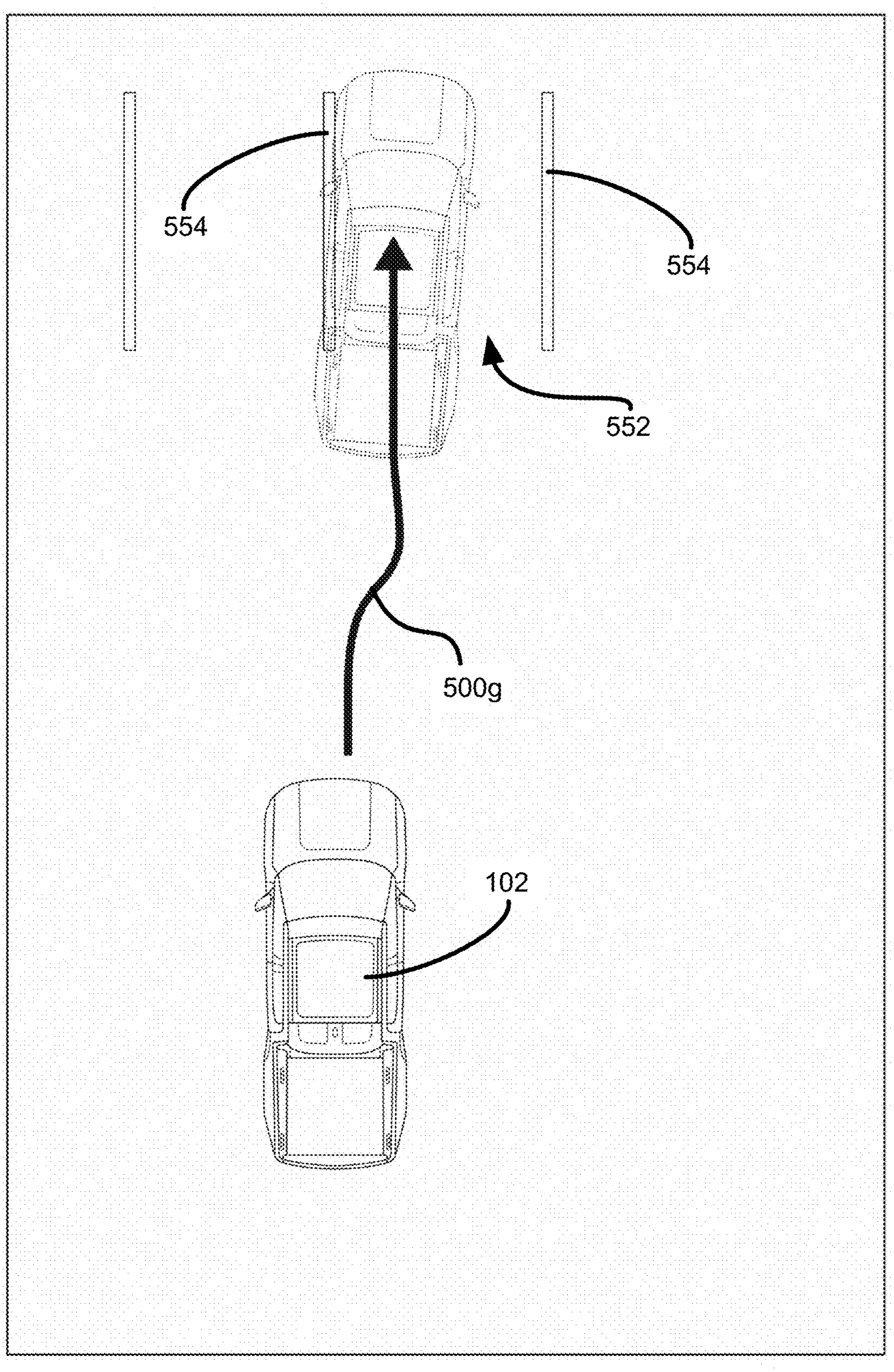

FIG. 5G illustrates another scenario in which a false negative might occur. The vehicle 100 drives along path 500*g* into a parking position 552 delineated by markers 554. In doing so, the driver of the vehicle 100 manually invokes display of the top-down view (see FIG. 4B) to help the driver center the vehicle 100 in the parking position 552. In this scenario, other vehicles are not present and therefore outputs of the ultrasonic sensors corresponding to parking are also not detected.

Figure 6:
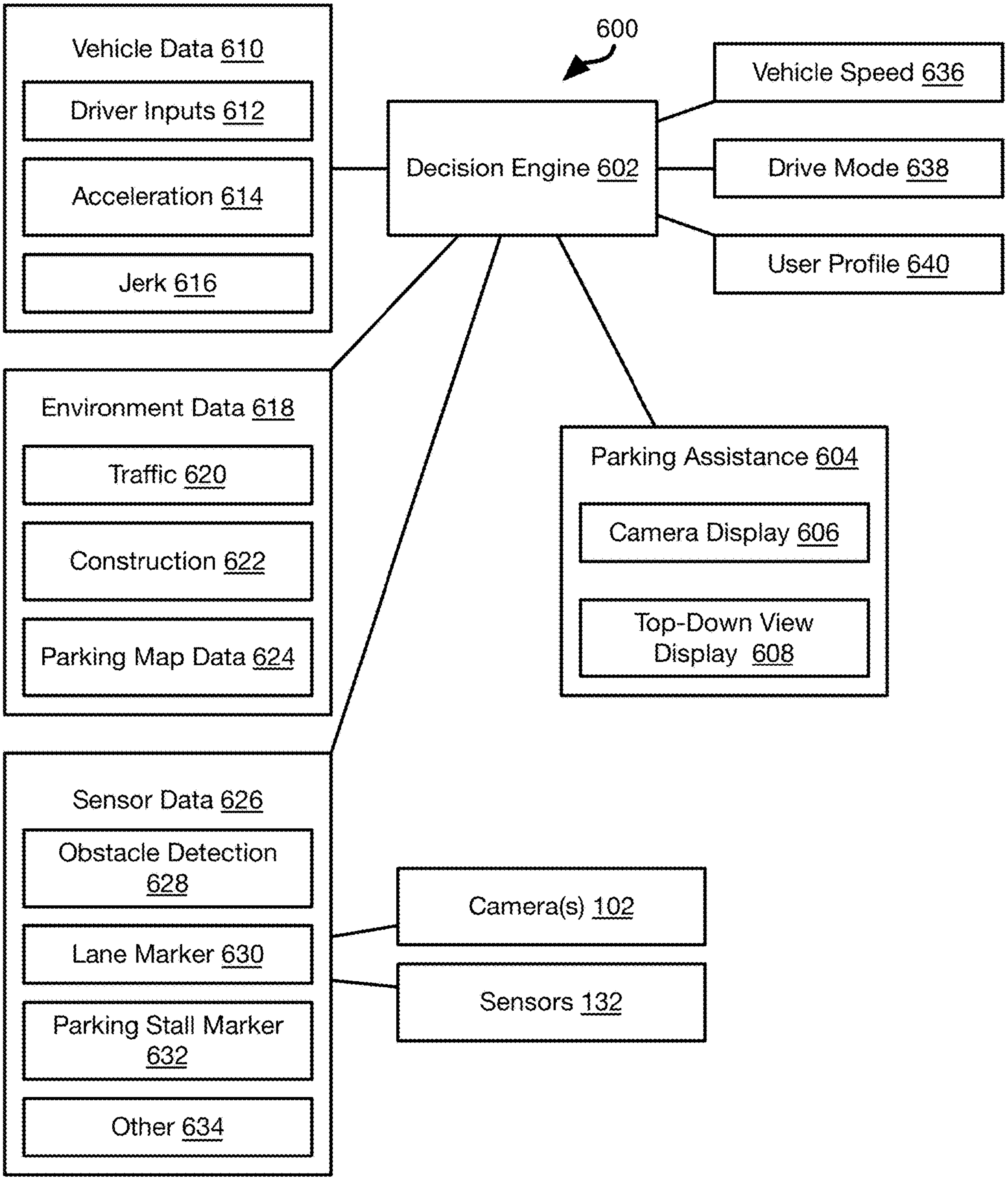
FIG. 6 is a schematic block diagram of components for dynamically determining when to display parking assistance in accordance with certain embodiments.

FIG. 6 illustrates an example system 600 that may be used to select when to display parking assistance, such as in any of the scenarios described above with respect to FIGS. 5A to 5G or other scenarios that may be encountered by the vehicle 100. The illustrated system 600 may be implemented by the control system 122 or some other computing device housed in the vehicle 100.

The system 600 includes a decision engine 602 that determines when to invoke output of parking assistance 604. The parking assistance 604 may include a display 606 of the output of a camera, such as a forward facing, rearward facing, or other camera. The parking assistance 604 may further include a display 608 of a top-down view of the vehicle 100 obtained from multiple cameras of the vehicle 100. The top-down view of the vehicle 100 may be generated by a graphics processing unit (GPU). When the top-down view is not used, the GPU is not used for this purpose, thereby saving power. The parking assistance 604 may be configurable by a user. For example, whichever items of parking assistance 604 were selected for display be a driver may be displayed. The selection may be either in stored preferences of the driver or based on inputs received the last time parking assistance 604 was displayed.

The decision engine 602 may receive data from various sources that indicate whether parking assistance 604 should be displayed, referred to herein as "trigger inputs." The trigger inputs include both data indicating that parking assistance 604 should be displayed as well as data indicating that parking assistance 604 is not needed. The decision engine 602 may receive data from various sources indicative of the duration for which parking assistance 604 should be displayed, referred to herein as "damping inputs." The damping inputs include data indicating that the duration should be extended and data indicating that the duration should be shortened.

The trigger inputs may include vehicle data 610 describing a state of the vehicle 100. For example, vehicle data 610 may include driver inputs 612 to the vehicle, such as steering angle, accelerator position, turn signal activation, or any other input that the vehicle 100 is configured to receive from a driver of the vehicle 100.

The vehicle data 610 may include data describing the dynamic state of the vehicle, such as acceleration 614 along one or more dimensions, such as the longitudinal and/or lateral dimensions. The acceleration 614 may include rotation or rotational acceleration about a vertical direction perpendicular to the longitudinal and/or lateral dimensions. The vehicle data 610 may further include the jerk 616 of the vehicle in one or more dimensions, i.e., the first derivative of any of the accelerations 614.

The trigger inputs may include environmental data 618. As used herein, environmental data 618 includes data that is obtained from a source other than the sensors (ultrasonic sensors, camera, radar, global positioning system (GPS) receiver, etc.) of the vehicle 100 itself. For example, traffic data 620 may be received wirelessly from an external source and indicate the speed of traffic and/or degree of congestion at a current location of the vehicle 100, or some region around the vehicle 100, such as within 1, 2, 3, or more kilometers. The environmental data 618 may include construction data 622 received wirelessly by the vehicle 100, the construction data 622 indicating construction activity around the location of the vehicle 100, such as on a road along which the vehicle 100 is currently traveling or within 1, 2, 3, or more kilometers from the current location of the vehicle 100. The environmental data 618 may include parking map data 624 indicating the locations of parking spots near the vehicle 100, such as within 50, 100, 200, or more meters from the current location of the vehicle.

The trigger inputs may include sensor data 626. The sensor data 626 may include the raw outputs of any of the cameras 102 and/or sensors 132. The sensor data 626 may also include the result of automated processing of outputs of any of the cameras 102 and/or sensors 132. For example, the sensor data 626 may include obstacle detection data 628. The obstacle detection data 628 may be derived from the output of one or more ultrasonic sensors and may therefore indicate a region around the vehicle in the field of view of the ultrasonic sensor and values such as a distance to a detected obstacle and an estimated size of the obstacle, e.g., derived from reflected signal strength. The obstacle detection data 628 may be the result of filtering the output of one or more ultrasonic sensors, e.g., a filter removing reflected signals below a threshold in order to remove noise. The obstacle detection data 628 may assign weights to detected obstacles, such as giving obstacles on the right side (or left side for left-side drive jurisdictions) higher weights than those detected on the opposite side since such obstacles are harder for a driver on the left side (or right side for left-side drive jurisdictions) to see.

The obstacle detection data 628 may include a confidence value indicating a likelihood that an obstacle is present. The obstacle detection data 628 may be derived from images received from one or more cameras, a point cloud received from a LIDAR sensor, or measurements of reflected signals received by a RADAR sensor. The obstacle detection data 628 may indicate a location (e.g., angle relative to the longitudinal axis) relative to the vehicle, distance from the vehicle, an estimated size of the object (e.g., bounding box), and/or a confidence value indicating a probability that an obstacle is in fact present. The obstacle detection data 628 may include a count of detected obstacles. The obstacle detection data 628 may be obtained by processing image, LIDAR, RADAR, and/or ultrasonic data using a machine learning model according to any approach known in the art. Obstacle detection data 628 may include a classification and a corresponding confidence value, the classification indicating an estimated type of an obstacle, e.g., person, animal, tree, curb, road sign, etc.

The sensor data 626 may include data describing lane marker data 630 detected in images received from one or more cameras. The lane marker data 630 may indicate the length of the lane marker detected or a confidence value corresponding to the length of the lane marker, the confidence value indicating the likelihood that a marking is in fact a lane marker. For example, a longer marker may be more likely to be identified as a lane marker. The lane marker data 630 may indicate a location and/or orientation of each lane marker relative to the vehicle 100.

The sensor data 626 may include data describing parking stall marker data 632 detected in images received from one or more cameras. The parking stall marker data 632 may indicate the length of parking stall markers detected or a confidence value corresponding to the length of the lane marker, the confidence value indicating the likelihood that a marking is in fact parking stall marker. For example, markings with a range of lengths corresponding to a parking stall may be more likely to be identified as parking stall markers. The parking stall marker data 632 may indicate a location and/or orientation of each parking stall marker relative to the vehicle 100.

The sensor data 626 listed above is exemplary only. Other data 634 derived from outputs of the sensors of the vehicle 100 may be used as well. In particular, any detection, classification, or other derived value describing objects sensed by the vehicle 100, such as curbs, road signs, sidewalks, buildings, or other structures may be included in the sensor data 626.

Damping inputs may include some or all of a vehicle speed 636, a drive mode 638, and a user profile 640. A vehicle speed 636 may be inversely correlated to damping: the faster the vehicle is going, the longer parking assistance 604 will be displayed. Different drive modes 638 may have different effects on damping. For example, drive modes indicating slow speed maneuvers, such as "off road," "sand," "snow," or the like may correlate to longer display of parking assistance 604. Other modes such as "eco," "normal," or "sport" may correlate to shorter display of parking assistance 604. In some embodiments, drive gear (forward, neutral, reverse) may be used as a damping input, e.g., a reverse gear indicating longer display of parking assistance 604. The user profile 640 may include an explicit user preference regarding the display of parking assistance 604. For example, a driver that has just begun driving, or just begun driving the vehicle 100, may indicate that more assistance is needed such that the parking assistance 604 will be displayed longer.

Figure 7A:
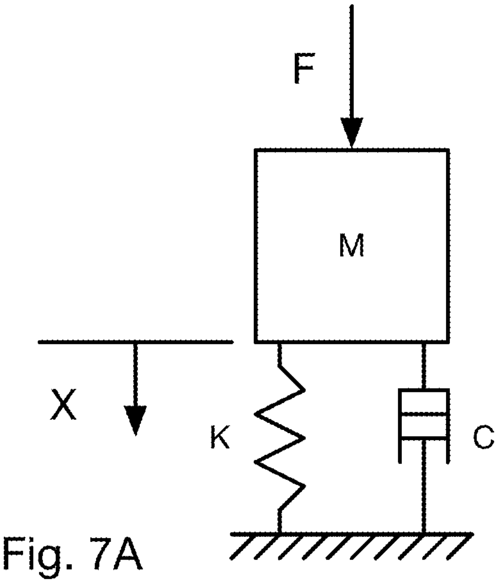
FIG. 7A illustrates an example physical system providing an analog for the dynamic model in accordance with certain embodiments.
Figure 7B:
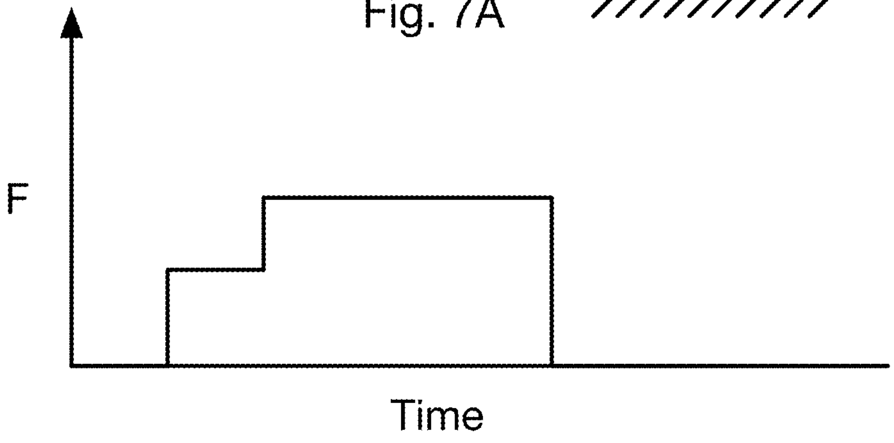
FIG. 7B illustrates an input to the dynamic model over time in accordance with certain embodiments.
Figure 7C:
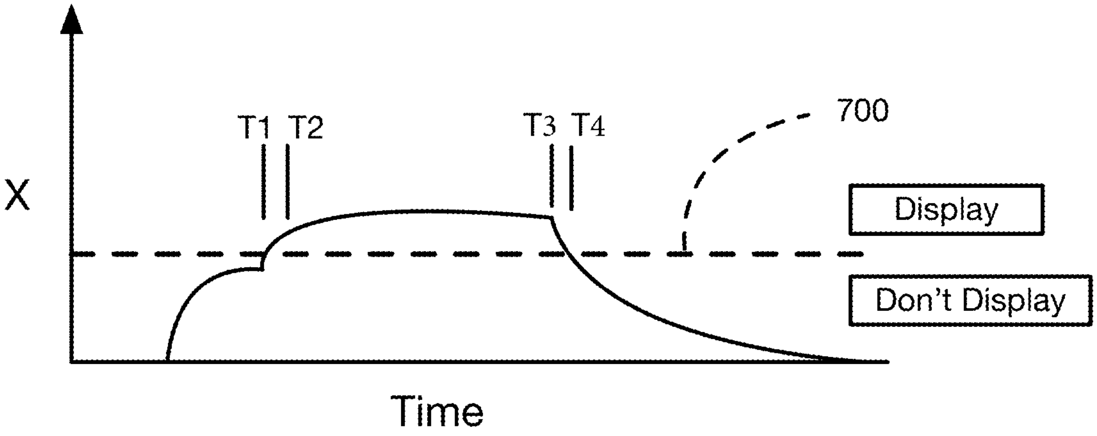
FIG. 7C illustrates the state of the dynamic model over time in response to the input in accordance with certain embodiments.

Referring to FIGS. 7A to 7C, in some embodiments, the decision engine 602 models the behavior of a dynamic system acted upon by the trigger inputs and defined at least in part by the damping inputs. For example, referring specifically to FIG. 7A, the dynamic system may be modeled as a mass M suspended by a spring with a spring constant K and damper with a damping coefficient C (a "spring-mass-damper system"). In a spring-mass-damper system, the mass M is acted upon by an external force F, by the spring with a force approximately equal to k*X, and by the damper with a force approximately equal to C*X' (velocity of the mass M). In response to the force F, the mass M is displaced by a distance X from a neutral position. The distance X, and the derivatives thereof, are therefore the state of the dynamic system that varies with respect to time.

The value of the applied force F varies over time as shown in FIG. 7B. The value of the state X varies in correspondence with F but with damping. Accordingly, in response to an applied force, the value of the state X will increase and asymptotically approach a steady state position corresponding to the applied force and the countering force of the spring. Stated differently, the state X will exponentially decay toward the steady state position due to damping of the damper.

The state of the dynamic system may be evaluated with respect to a threshold 700. For example, where the state X is above the threshold, the parking assistance 604 is displayed and when the state X is below the threshold, the parking assistance 604 is not displayed. As is apparent, due to the damping of the dynamic system, a force F applied at time T1 may not result in the state X rising above the threshold 700 in response to the force F until a later time T2 due to damping. Likewise, when the force F is reduced at time T3, the state X may not fall below the threshold 700 until a later time T4 due to damping.

The behavior of the dynamic system may be modeled by an equation of the form shown in Equation 1, where A and B are a function of F and K and $\tau$ and $\upsilon$ are a function of C, K, and M. In general, A and B will increase with increasing F and decrease with increasing K. The values of $\tau$ and $\upsilon$ will increase with increase in C. Increase in $\tau$ and $\upsilon$ means that the exponential rise or fall to a steady state value will be slower resulting in greater delays (e.g., T2–T1 and T4–T3). The value of M in the dynamic model may be accounted for in values selected for A, B, $\tau$ and $\upsilon$ and may lack an analog in terms of the vehicle 100. The values of A, B, $\tau$ and $\upsilon$ may be tuned over time, such as in response to feedback from the driver. For example, instances of the driver turning off parking assistance 604 or manually invoking parking assistance 604 may be used as feedback as to whether a decision of the decision engine 602 to display or not display parking assistance 604 was correct.

$$X(t) = Ae^{-t/\tau} + Be^{-t/\upsilon} \tag{1}$$

Table 1 lists factors of F (e.g., trigger inputs) and their contribution (increasing F or decreasing F). Table 2 lists factors of C (e.g., damping inputs) and their contributions to C (increasing C or decreasing C). The factors listed in Tables 1 and 2 are exemplary only. The factors for F and C may be combined to obtain F and C, respectively, by summing, weighting and summing, or performing some other function. In some embodiments, K is represented as a vector, each element of the vector being multiplied by one of the factors of F, e.g., $$F*K = \sum_1^N f_1 k_1,$$

where $f_1$ is a factor of F, $k_1$ is an element of K that is used as a weighting for factor $f_1$, and N is the number of factors. A and B in Equation 1 may then be functions of F*K. The sign of each factor $f_1$ may be positive (increasing contribution) or negative (decreasing contribution).

TABLE 1

Factors Used to Calculate F

| Factor | Contribution |
|---|---|
| Steering Angle | Increasing |
| Acceleration (Longitudinal) | Decreasing |
| Acceleration (Lateral) | Increasing |
| Jerk (Longitudinal) | Decreasing |
| Jerk (Lateral) | Increasing |
| Traffic Congestion (Severity and/or Proximity) | Decreasing |
| Construction Proximity | Decreasing |
| Parking Spot Proximity | Increasing |
| Obstacle Detected (Confidence Score and/or Proximity) | Increasing |
| Lane Marker Detected (Confidence Score and/or Length) | Decreasing |
| Parking Stall Marker Detected (Confidence Score) | Increasing |

TABLE 2

Factors Used to Calculate C

| Factor | Contribution |
|---|---|
| Speed | Decreasing |
| Off-Roading Mode Active | Decreasing |
| Sand Mode Active | Decreasing |
| Snow Mode Active | Decreasing |
| Beginner Driver Preference | Increasing |
| Customized Setting | Increasing or Decreasing per Driver Preference |

Figure 8:
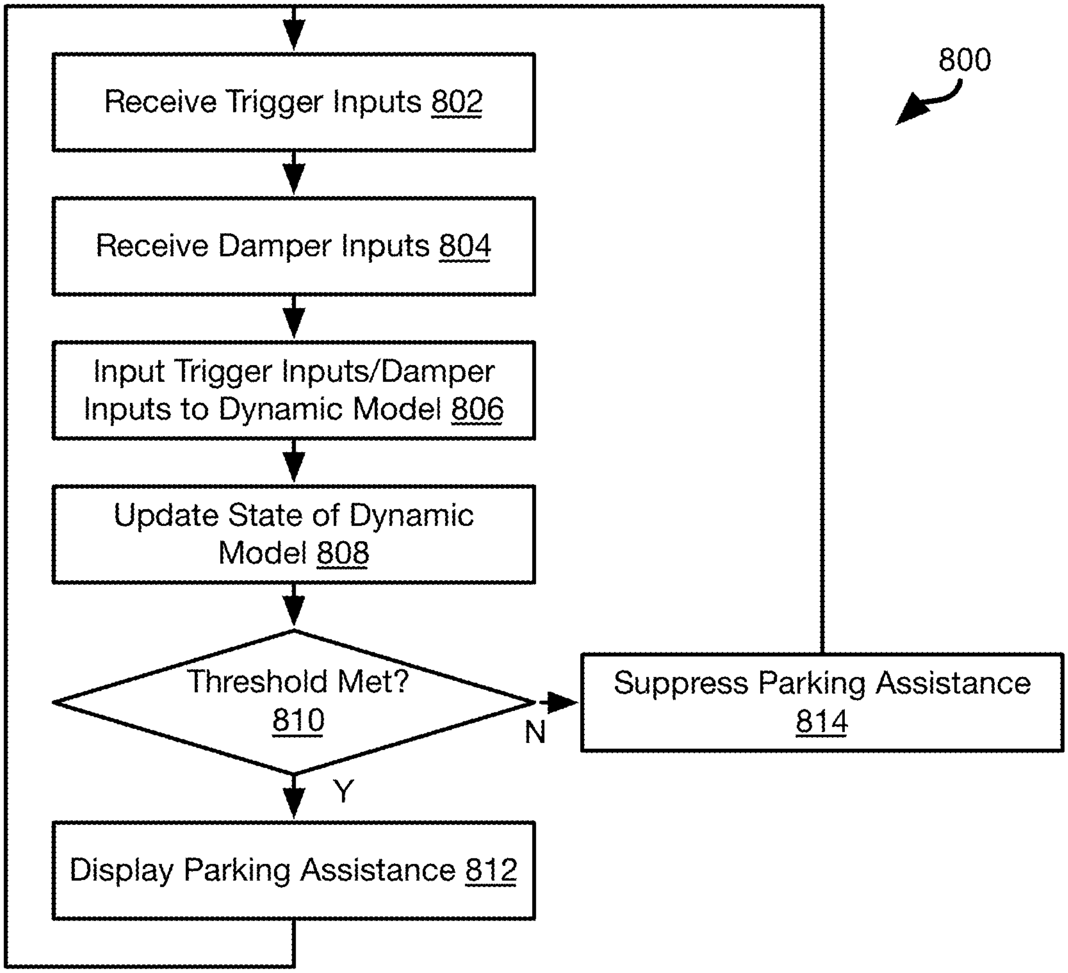
FIG. 8 is a process flow diagram of a method for using a dynamic model to determine when to display parking assistance in accordance with certain embodiments.

FIG. 8 illustrates a method 800 that may be used by the decision engine 602 to determine whether to display the parking assistance 604 using a model of a dynamic system, such as the spring-mass-damper system of FIG. 7A. The method 800 may be repeated at regular intervals or in response to one or more trigger inputs being detected or ceasing to be detected.

The method 800 includes receiving, at step 802, one or more trigger inputs, such as any of the trigger inputs described above. The method 800 may include receiving, at step 804 one or more damping inputs, such as any of the damping inputs described above. Note that the damping inputs may be relatively static such that step 804 may be omitted for some or all iterations of the method 800 and previously received values will be used instead.

The method 800 includes inputting, at step 806, the trigger inputs and damper inputs into a dynamic model, such as a model of a dynamic system, such as the spring-mass-damper system of FIG. 7A. The method 800 includes updating, at step 808, the state of the dynamic model. For example, step 808 may include modeling behavior of the dynamic model in response the trigger inputs. As described above with respect to FIGS. 7A to 7C, step 808 may include modeling displacement over time of a mass M acted on by a spring with spring coefficient K and a damper with a damping coefficient C in response to a force F. Step 808 may include evaluating a series of differential equations at a plurality of times steps or calculating the state according to a closed form equation (e.g., Equation 1) in terms of the trigger inputs and a time elapsed relative to when each trigger input was received.

The method 800 may include evaluating, at step 810, whether a threshold condition is met by the state of the dynamic model. Since the state of the dynamic model is time dependent, step 810 may be evaluated repeatedly over time to detect when the exponential decay of the dynamic model to a steady state value results in the state of the dynamic model meeting or ceasing to meet the threshold condition.

For example, the threshold condition may be the state X of the dynamic model rising above a threshold 700 or falling below the threshold 700. If the threshold condition is found to be met, parking assistance 604 is displayed at step 812. If not, the display of parking assistance 604 is suppressed 814, which may include ceasing to display the parking assistance 604 or refraining from displaying the parking assistance 604.

Figure 9:
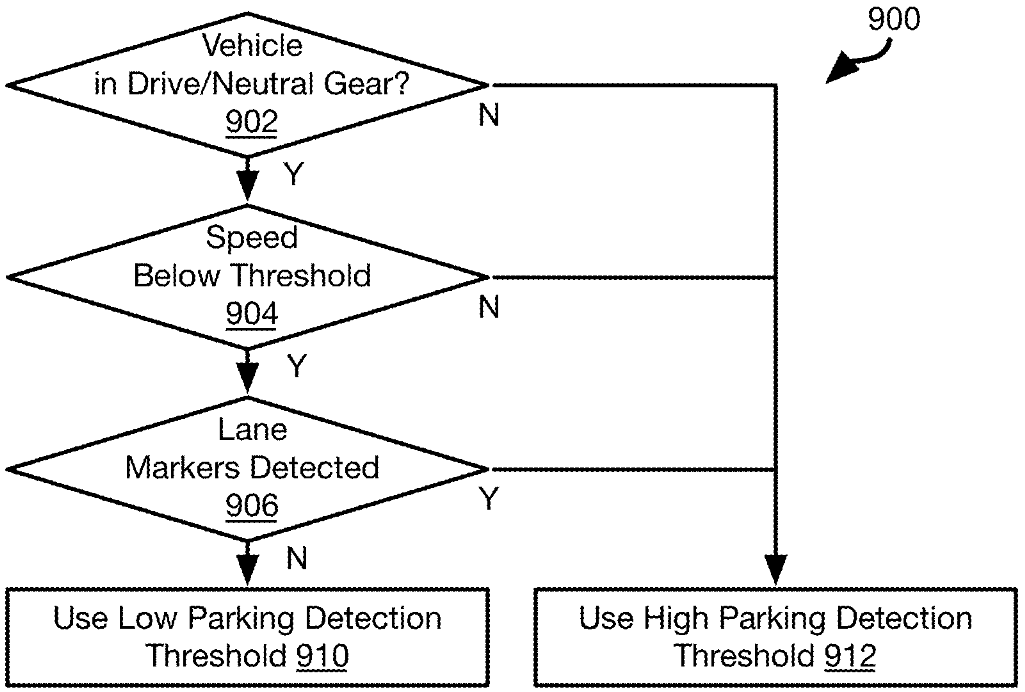
FIG. 9 is a process flow diagram of an alternative method for determining when to display parking assistance in accordance with certain embodiments.

FIG. 9 illustrates a method 900 that may be used with or in place of the method 800. The method 900 may be executed by the decision engine 602 with or without the use of a dynamic model. In the method 900, the state of the vehicle is evaluated with respect to one or more conditions. For example, the method 900 may include evaluating, at step 902, whether the gear selection of the vehicle 100 is in drive or neutral. The method 900 may include evaluating, at step 904, whether the speed of the vehicle is below a speed threshold, such as below 6, 5, 4, or 3 miles per hour or some other speed. The method 900 may include evaluating, at step 906, whether lane markers (as opposed to parking stall markers) are detected. If the vehicle is found to be in drive or neutral, at a speed below the speed threshold, and lane markers are not detected, the method 900 may include using a low parking detection threshold at step 910. Otherwise, the method 900 includes using a high parking detection threshold at step 912.

As used herein the "low parking detection threshold" and the "high parking detection threshold" may be evaluated with respect to values for one or more trigger inputs as described herein such that a value above the threshold will cause display of the parking assistance 604 and a value below the threshold will result in ceasing or refraining from displaying the parking assistance 604. The value compared to the low or high threshold may include a weighted combination of the trigger inputs, such as F*K as defined above. The low parking threshold and high parking threshold may be evaluated with respect to the state X of the dynamic model as defined above. As implied, the low parking threshold is lower than the high parking threshold such that when the low parking threshold is used, the parking assistance 604 is more likely to be displayed than when the high parking threshold is used. The method 900 may therefore be used to suppress the parking assistance 604 in situations that clearly do not call for the display thereof.

The descriptions of the various embodiments of the present disclosure have been presented for purposes of illustration. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure may exceed the specific described embodiments. Instead, any combination of the features and elements, whether related to different embodiments, is contemplated to implement and practice contemplated embodiments. Furthermore, although embodiments disclosed herein may achieve advantages over other possible solutions or over the prior art, the embodiments may achieve some advantages or no particular advantage. Thus, the aspects, features, embodiments and advantages discussed herein are merely illustrative.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a one or more computer processing devices. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Certain types of storage devices that include these mediums include: diskette, hard disk, random access memory (RAM), read only memory (ROM), erasable programmable read only memory (EPROM or Flash memory), static random access memory (SRAM), compact disc read only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, refers to non-transitory storage rather than transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but the storage device remains non-transitory during these processes because the data remains non-transitory while stored.

While the foregoing is directed to embodiments of the present disclosure, other and further embodiments may be devised without departing from the basic scope thereof, and the scope thereof is determined by the claims that follow.

What is claimed is:

1. A vehicle, comprising:

an output device configured to communicate to a driver of the vehicle; and an in-vehicle control system configured to:

evaluate one or more trigger inputs including at least one of a current dynamic state of the vehicle or an attribute of an environment of the vehicle;

process the one or more trigger inputs according to a dynamic model having a state with a time-dependent response to changes in the one or more trigger inputs, wherein the state comprises a time-varying value that is based on the one or more trigger inputs and on time elapsed relative to when each of the one or more trigger inputs is received;

evaluate the state of the dynamic model with respect to a threshold condition, wherein the threshold condition is applied to the time-varying value; and in response to the dynamic model satisfying the threshold condition, provide guidance to the driver through the output device.

2. The vehicle of claim 1, wherein the one or more trigger inputs include acceleration of the vehicle.

3. The vehicle of claim 1, wherein the one or more trigger inputs include a steering angle of the vehicle.

4. The vehicle of claim 1, wherein the one or more trigger inputs include a derivative of acceleration of the vehicle.

5. The vehicle of claim 1, wherein the one or more trigger inputs include outputs of one or more sensors of the vehicle.

6. The vehicle of claim 1, wherein the one or more trigger inputs include information describing obstacles detected using one or more sensors of the vehicle.

7. The vehicle of claim 1, wherein the one or more trigger inputs include information describing markings detected using one or more cameras of the vehicle.

8. The vehicle of claim 1, wherein the one or more trigger inputs include data describing one or more of traffic congestion, construction, or parking locations in proximity to the vehicle.

9. The vehicle of claim 1, wherein the guidance is parking assistance.

10. The vehicle of claim 9, wherein the parking assistance is a display of a top-down view of the vehicle and surroundings of the vehicle generated from outputs of a plurality of cameras of the vehicle.

11. The vehicle of claim 1, wherein the dynamic model is a model of a spring-mass-damper system.

12. The vehicle of claim 1, wherein the in-vehicle control system is configured to process the one or more trigger inputs according to the dynamic model by:

modeling a first exponential decay of the state of the dynamic model to a first steady state value in response to the one or more trigger inputs.

13. The vehicle of claim 12, wherein the in-vehicle control system is configured to process the one or more trigger inputs according to the dynamic model by:

modeling a second exponential decay of the state of the dynamic model to a second steady state value in response to ending of the one or more trigger inputs.

14. A non-transitory computer readable medium storing executable code that, when executed by one or more processing devices, causes the one or more processing devices to perform a method comprising:

evaluating one or more trigger inputs including at least one of a current dynamic state of a vehicle or an attribute of an environment of the vehicle;

processing the one or more trigger inputs according to a dynamic model having a state with a time-dependent response to changes in the one or more trigger inputs, wherein the state comprises a time-varying value that is based on the one or more trigger inputs and on time elapsed relative to when each of the one or more trigger inputs is received;

evaluating the state of the dynamic model with respect to a threshold condition, wherein the threshold condition is applied to the time-varying value; and in response to the dynamic model satisfying the threshold condition, providing guidance to the driver through an output device.

15. The non-transitory computer readable medium of claim 14, wherein the one or more trigger inputs include at least one of: acceleration of the vehicle, a steering angle of the vehicle, a derivative of the acceleration of the vehicle, or outputs of one or more sensors of the vehicle.

16. The non-transitory computer readable medium of claim 14, wherein the one or more trigger inputs include information describing at least one of:

obstacles detected using one or more sensors of the vehicle;

markings detected using one or more cameras of the vehicle; and data describing one or more of traffic congestion, construction, or parking locations in proximity to the vehicle.

17. The non-transitory computer readable medium of claim 14, wherein the guidance includes a display of a top-down view of the vehicle and surroundings of the vehicle generated from outputs of a plurality of cameras of the vehicle.

18. The non-transitory computer readable medium of claim 14, wherein the dynamic model is a model of a spring-mass-damper system.

19. The non-transitory computer readable medium of claim 14, wherein the method further comprises processing the one or more trigger inputs according to the dynamic model by: modeling a first exponential decay of the state of the dynamic model to a first steady state value in response to the one or more trigger inputs.

20. The non-transitory computer readable medium of claim 19, the method further comprises processing the one or more trigger inputs according to the dynamic model by:

modeling a second exponential decay of the state of the dynamic model to a second steady state value in response to ending of the one or more trigger inputs.

* * * * *